United States Patent [19]

Kamiya et al.

[11] Patent Number: 4,705,206
[45] Date of Patent: Nov. 10, 1987

[54] METHOD FOR BRAZING A MAGNESIUM-CONTAINING ALUMINUM ALLOY

[75] Inventors: Hiroshi Kamiya, Toyohashi; Takeshi Iguchi, Gifu; Shigenobu Fukumi, Oubu, all of Japan

[73] Assignee: Nippondenso Co., Ltd., Kariya, Japan

[21] Appl. No.: 810,295

[22] Filed: Dec. 18, 1985

[51] Int. Cl.⁴ ............................................. B23K 31/02
[52] U.S. Cl. .................................... 228/183; 228/207; 228/263.17
[58] Field of Search ................... 228/207, 203, 263.17, 228/183, 217

[56] References Cited
U.S. PATENT DOCUMENTS
4,556,165  12/1985  Yamawaki ........................... 228/223

FOREIGN PATENT DOCUMENTS
0071749  6/1979  Japan .................................... 228/217
0202996  11/1983  Japan .................................... 228/183
0113969  6/1984  Japan .................................... 228/183
0247469  12/1985  Japan ............................... 228/263.11

Primary Examiner—Nicholas P. Godici
Assistant Examiner—Karen Skillman
Attorney, Agent, or Firm—Cushman, Darby & Cushman

[57] ABSTRACT

An aluminum alloy including magnesium can be joined by brazing even when flux made of potassium fluoaluminates is employed. The aluminum alloy including magnesium is heated in a vacuum, so that magnesium in the aluminum alloy evaporates from the surface of the aluminum alloy. The weight ratio of magnesium at the surface of the aluminum alloy can be reduced to less than 0.5 as a result of the heating step. The aluminum alloy treated by this operation is, thereafter covered with brazing material and clad with flux. After that, the aluminum alloy is heated in a furnace in order to melt the brazing material.

8 Claims, 7 Drawing Figures

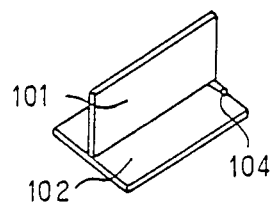
Fig. 1
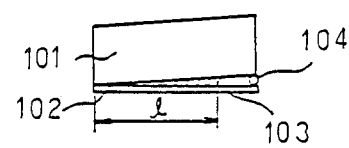
Fig. 2
Fig. 3
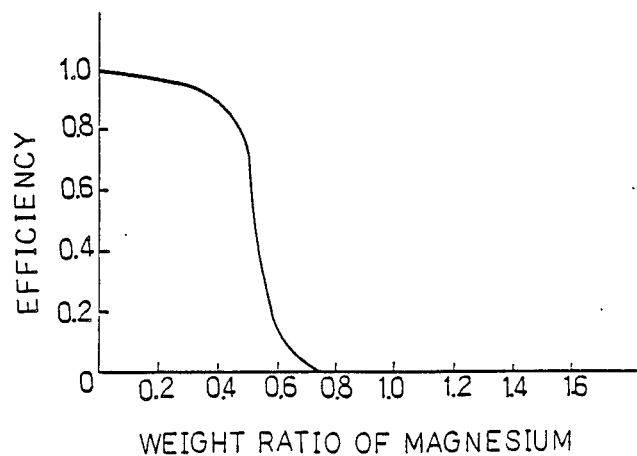

METHOD FOR BRAZING A MAGNESIUM-CONTAINING ALUMINUM ALLOY

BACKGROUND OF THE INVENTION

This invention relates to a method for brazing a magnesium-containing aluminum alloy. The aluminum alloy brazing of the present method is useful in the manufacture of a heat exchanger.

Conventionally, a chloride salt including alkaline metal and alkaline earth metal is used as a flux for the brazing of aluminum alloys. Such a chloride salt, however, is a water soluble material. Therefore, such a flux should be cleaned from the work piece by hot water, nitric acid or water immediately after the brazing operation has been completed, so that such a flux requires the use of complex cleaning operations.

Flux which does not have a character of deliquescence has become popular. Such a flux is made of potassium fluoaluminates; this flux is described in U.S. Pat. No. 3,951,238.

According to the results of an experiment conducted by the present inventors, this type flux, made of potassium fluoaluminates, can not be used in the brazing of aluminum alloys including magnesium. When the flux made of potassium fluoaluminates is used for such brazing, this flux makes the brazing process an inefficient one.

This face was found by an experiment shown some of the results of which are in FIGS. 1 and 2. The numeral 131 of FIG. 1 indicate an aluminum alloy clad by brazing material (BA12PC). The numeral 102 indicates a test piece. The test piece 102 is an aluminum alloy which includes magnesium. The weight ratios of magnesium to aluminum included in the test pieces 102 are different within various test pieces 102. Numeral 104 of FIG. 1 indicates a thin bar made of stainless steel which makes narrow gap between the aluminum alloy 101 and test piece 102.

After the test piece 102 is set on the aluminum alloy 101 and bar 104, these materials 101, 102, 103 and 104 are heated to melt the brazing material 3 clad on the aluminum alloy 1. The length L of brazing material 3 is then, measured. FIG. 3 shows results of the experiment described above. In this experiment, the length L is compared with a length M of an aluminum alloy A3003 (which does not include any magnesium).

As shown in FIG. 3, an aluminum alloy including magnesium more than 0.2% weight ratio makes the brazing inefficient. An aluminum alloy which includes about 0.8% weight ratio can not be joined by brazing. This inefficiency is, therefore, understood to be directly correlated with the relative magnitude of presence of magnesium in the aluminum alloy. The magnesium reacts with with fluoride to make magnesium fluoride, and this magnesium fluoride hinders the brazing.

The magnesium component included in the aluminum alloy is desired in order to increase the strength of the alloy. A connector of an automotive heat exchanger such as a condenser of a car air conditionor, for example, employs an aluminum alloy including magnesium for increasing its strength. Since it is desirable that the connector be of a higher strength than other parts of the condenser, the connector is made of an alloy of aluminum (Al)—zinc (Zn)—magnesium (Mg) such as the aluminum alloy A7004 (AA standard). FIG. 4 shows the relationship between the stretch strength of typical aluminum alloys and the amount of magnesium included therein. As shown in FIG. 4, such aluminum alloys having enough strength have a magnesium weight ratio of more than 1.0.

SUMMARY OF THE INVENTION

This invention has a object to enable brazing of aluminum alloys including high magnesium.

The mechanism by which this invention operates to produce the desired result is to reduce the amount of the magnesium in the surface portion of the aluminum alloy. The metallic and chemical phenomenon occurring during the brazing operation mainly depends upon the metallic character of the surface. Therefore, it is important to reduce the amount of magnesium in the surface portion of the aluminum alloy.

In other words, the object of this invention is to reduce the amount of magnesium from the surface and the adjacent portion to the surface of the aluminum alloy by some method so that the aluminum alloy treated by this method can be joined by the brazing.

The method by which this object of this invention is achieved is to heat the aluminum alloy including magnesium under a vacuum condition.

The present inventors studied in order to ascertain the efficiency of vacuum heating treatment. They measured the weight ratio of the magnesium in the surface portion of the aluminum alloy (A7004), which is the same material as that of used as the connector of the condenser, after heating under a vacuum condition. The conditions of the experiment were as follows: The temperature was 600° C., the heating period was 20 minutes, the density of magnesium in the surface of the aluminum alloy was represented by the analytical value of the surface.

FIG. 5 shows results of this experiment. As shown in FIG. 5, the amount of the magnesium in the surface portion of the aluminum alloy is better when that is less than a 0.5 weight ratio, for making the brazing efficient. The flowing capability of the brazing becomes worse when the amount of magnesium in the surface portion of the alloy has a weight ratio more than approximately 0.2. After the weight ratio of the magnesium in the surface portion of the alloy becomes more than approximately 0.8, the brazing can not be completed. A weight ratio 0.5, which is an intermediate value between 0.2 and 0.8 weight ratio makes the flowing capability reduction less than half that of the standard value.

BRIEF DESCRIPTION OF THE DRAWINGS

FIG. 1 is a perspective view of the test piece,
FIG. 2 is a front view of the test piece,
FIG. 3 shows results of a set of experiments done on test pieces such as the test piece of FIGS. 1 and 2.

DETAILED DESCRIPTION OF PREFERRED EMBODIMENT

Figure 4:
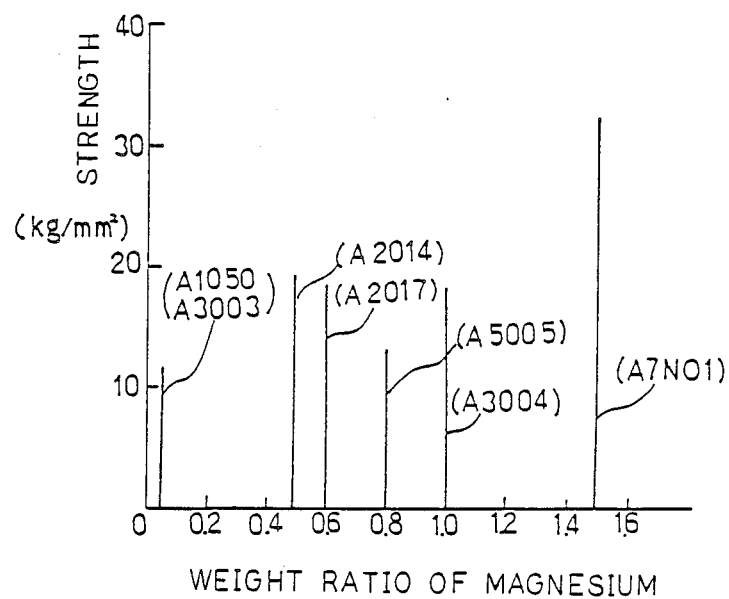
FIG. 4 is a plot of the strengths of some typical aluminum alloys.
Figure 5:
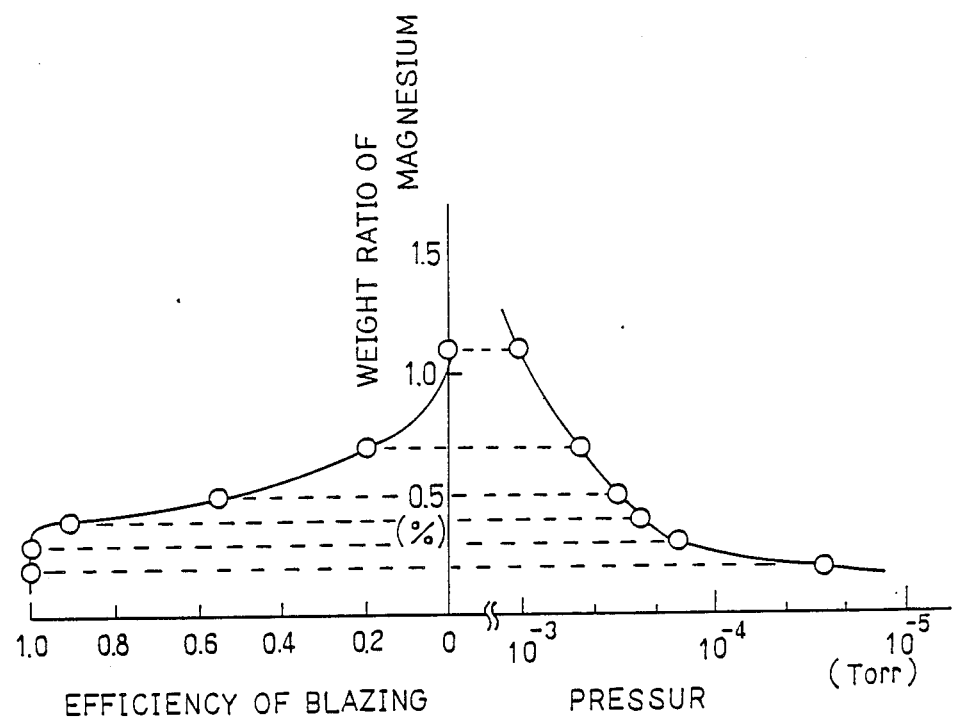
FIG. 5 shows the relationship between the weight ratio of an magnesium in the surface portion of aluminum alloy and the efficiency of brazins.
Figure 6:
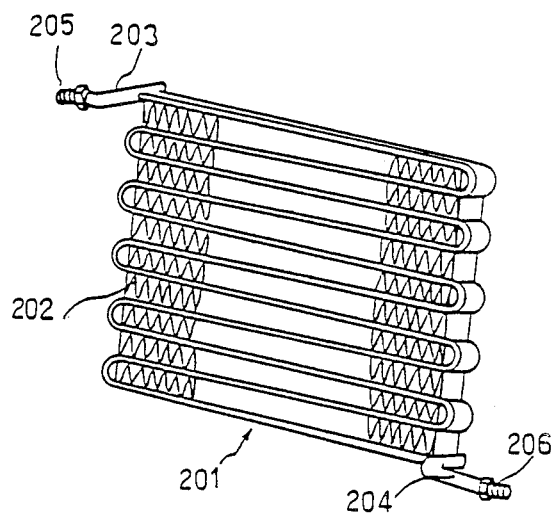
FIG. 6 is the perspective view of the condenser of an automotive air conditioner.

FIG. 6 shows a condenser of an automotive air conditioner. The condenser is a finished product made of aluminum alloys. Numeral 201 indicates the air conditioner coolant tube passing therethrough. Numeral 202 indicates fins which promote heat exchange between the coolant in the tube 201 and cooling air. Numerals 203 and 204 respectively designate pipes which are connected with the tube 201. Numerals 205 and 206 respectively designate connectors provided at the end of the pipes 203 and 204. The connectors 205 and 206 connect the condenser with a compressor (not shown) and an expansion valve (not shown). These elements 201–206 are made of aluminum alloys. Since the connectors 205 and 206 are required to be of a comparatively high strength, the connectors 205 and 206 are made of aluminum alloy A7N01 (the weight ratio of magnesium being about 1.5%).

The treatment operation for reducing the weight ratio of magnesium from the aluminum alloys of the connectors 205 and 206 is described as follow: A plurality of the connectors 205 and 206 are degreased using trichloroethylene and then are dried. After that, the connectors are set on a carrier. Then, the elements are carried into a furnace by the carrier. The vacuum condition in the furnace is about $5.0 \times 10^{-5}$ torr, and the temperature condition in the furnace is 600° C. The elements are heated in the furnace for about 20 minutes. During this treatment operation, the magnesium in the surface and adjacent to the surface of the elements evaporates from the elements, so that the weight ratio of magnesium is reduced to less than a predetermined threshold magnitude. The connectors after this treatment operation can be joined by blazing.

The connectors 205 and 206 after this treatment operation have set with the other elements 201–204 which are already been degreased and dried. Brazing material is deposited at the connecting portion between the connectors 205 and 206 and the pipes 204 and 205. Then a flux made of potassium fluoaluminates is sprayed toward an assemblage of the elements 201–206, so that 10 g/m$^2$ of flux is clad on this assemblage. The flux is made of $K_3AlF_6$, $KAlF_4$, or $K_2AlF_5$ or a mixture of water (pure water is preferred) and these.

Then, the assemblage of these elements 201–206 is preheated so that the assemblage reaches a temperature of 300° C. The preheated assemblage is carried into a furnace having a nitrogen atmosphere, and heated for about 2 minutes in order to increase the temperature of the assemblage to 600° C. The brazing operation is completed only by these treatment and heating operations. A cleaning operation is not necessary for this brazing method.

Figure 7:
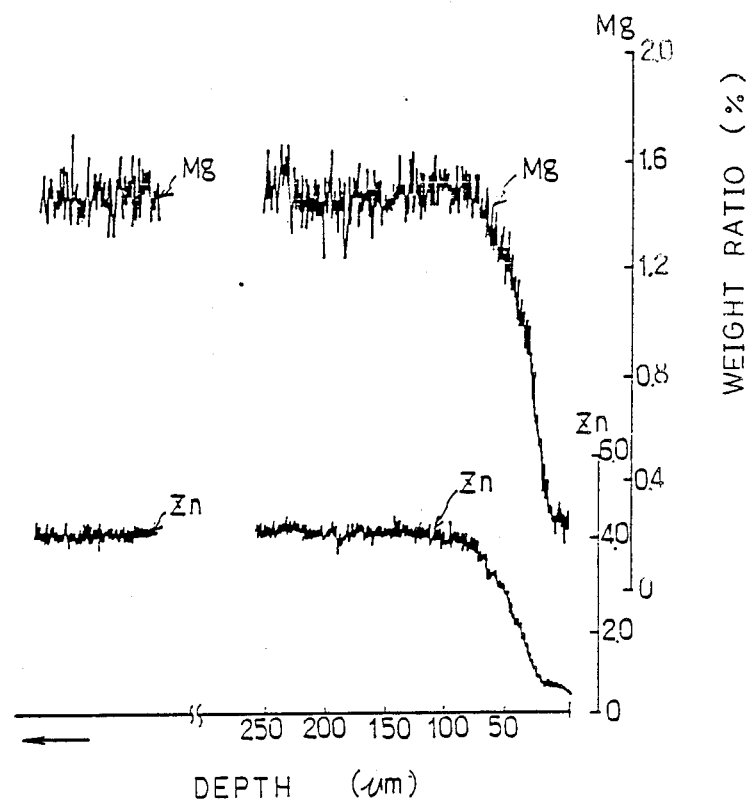
FIG. 7 is a plot of the weight ratios of magnesium and zinc as a function of depth, in brazed test pieces.

FIG. 7 indicates weight ratios of magnesium and zinc in the aluminum alloys of the connectors 205 and 206. As shown in FIG. 7, both magnesium and zinc are evaporated from the surface portion of the aluminum alloy, the depth of surface portion being about 70 μm. In particular, the weight ratio of magnesium is gradually reduced from the core of the aluminum alloy to the surface thereof. The weight ratio of magnesium is reduced to 0.3 at the surface. Therefore, the connectors 205 and 206 can be joined completely by brazing. Moreover, since the weight ratio of magnesium in the surface is reduced, the connectors 205 and 206 can be joined using a small amount of flux. In other words, the connectors 205 and 206, because of the treatment operation can be successfully joined, with a saving in the amount of the flux used being realized.

The condition of the treatment operation (vacuum degree, temperature and heating period) can be varied depending on the desired reduction in weight ratio of magnesium at the surface. If in carrying-out the treatment operation, a higher vacuum degree, higher temperature and longer heating period, are used the weight ratio of magnesium in the surface portion of aluminum alloy can become even smaller. The temperature in the furnace, of course, should be kept under the melting point of the aluminum alloy. The melting point of aluminum alloy A7004, for example, is approximately 607° C.

As described above, the brazing method of this invention can join aluminum alloys including magnesium which could not be jointed by conventional brazing methods. Furthermore, the brazing method of this invention can save on the amount of flux required, so that the brazing method of this invention can reduce the capital cost of manufacturing a brazed part.

We claim:
1. A method for brazing a magnesium-containing aluminum alloy, comprising:
   (a) providing an element made of said alloy and having magnesium distributed generally evenly throughout at a concentration level which exceeds a predetermined threshold value;
   (b) thereafter, subjecting said element to a treatment operation for reducing said magnesium concentration level only in a surface portion of at least a connection site on said element to no higher than said predetermined threshold value;
   (c) thereafter, depositing brazing material on said element in the vicinity of said connection site;
   (d) thereafter, cladding said brazing material with a potassium fluoaluminate flux; and
   (e) thereafter, heating said element and said brazing material sufficiently to melt said brazing material at said connection site.

2. The method of claim 1, wherein:
step (b) is conducted in a vacuum.

3. The method of claim 2, wherein:
said vacuum is $5.0 \times 10^{-5}$ torr.

4. The method of claim 2, wherein:
step (b) is conducted at an elevated temperature of about 600° C.

5. The method of claim 4, wherein:
said element is subjected to said elevated temperature for about 20 minutes.

6. The method of claim 1 wherein:
said predetermined threshold value is a magnesium:aluminum weight ratio of 0.5.

7. The method of claim 1, wherein:
said element is a connector for a condenser of an automotive air conditioner and step (e) is conducted with said connector juxtaposed with an end of a coolant tube at said connection site for mounting said connector on said end of said coolant tube.

8. The method of claim 1, wherein:
said aluminum alloy is one selected from the group consisting of A7001 and A7004.

* * * * *